United States Patent [19]

Gould

[11] Patent Number: 4,486,968
[45] Date of Patent: Dec. 11, 1984

[54] FISHING ROD SUPPORT AND TRIGGER

[76] Inventor: Kermit T. Gould, 3228-A Wade Hampton Blvd., Taylors, S.C. 29687

[21] Appl. No.: 450,069

[22] Filed: Dec. 15, 1982

[51] Int. Cl.³ ............................................. A01K 97/10
[52] U.S. Cl. ......................................... 43/15; 43/21.2
[58] Field of Search .................................. 43/15, 21.2

[56] References Cited

U.S. PATENT DOCUMENTS

| | | | |
|---|---|---|---|
| 2,551,996 | 5/1951 | Cherubini | 43/15 |
| 3,284,943 | 11/1966 | Wedel | 43/15 |
| 3,453,765 | 7/1969 | Gibbons | 43/21.2 |
| 3,691,665 | 9/1972 | Niles | 43/15 |
| 3,699,701 | 10/1972 | Jacobs | 43/15 |
| 3,881,269 | 5/1975 | Timmons | 43/15 |
| 4,231,178 | 11/1980 | Black | 43/21.2 |

FOREIGN PATENT DOCUMENTS 488788  12/1952  Canada ................................. 43/15

Primary Examiner—Nicholas P. Godici
Assistant Examiner—Marc Hodak
Attorney, Agent, or Firm—B. P. Fishburne, Jr.

[57] ABSTRACT

A ground-embedded and anchored stake carries a cross arm on which is pivotally mounted a support sleeve for the handle of a fishing rod. The support sleeve is biased by a tension spring to a fishing catching position and is releasably held in a normal waiting position by a simple latch which engages the cross arm and is released therefrom automatically when a fish strikes the hook.

3 Claims, 7 Drawing Figures

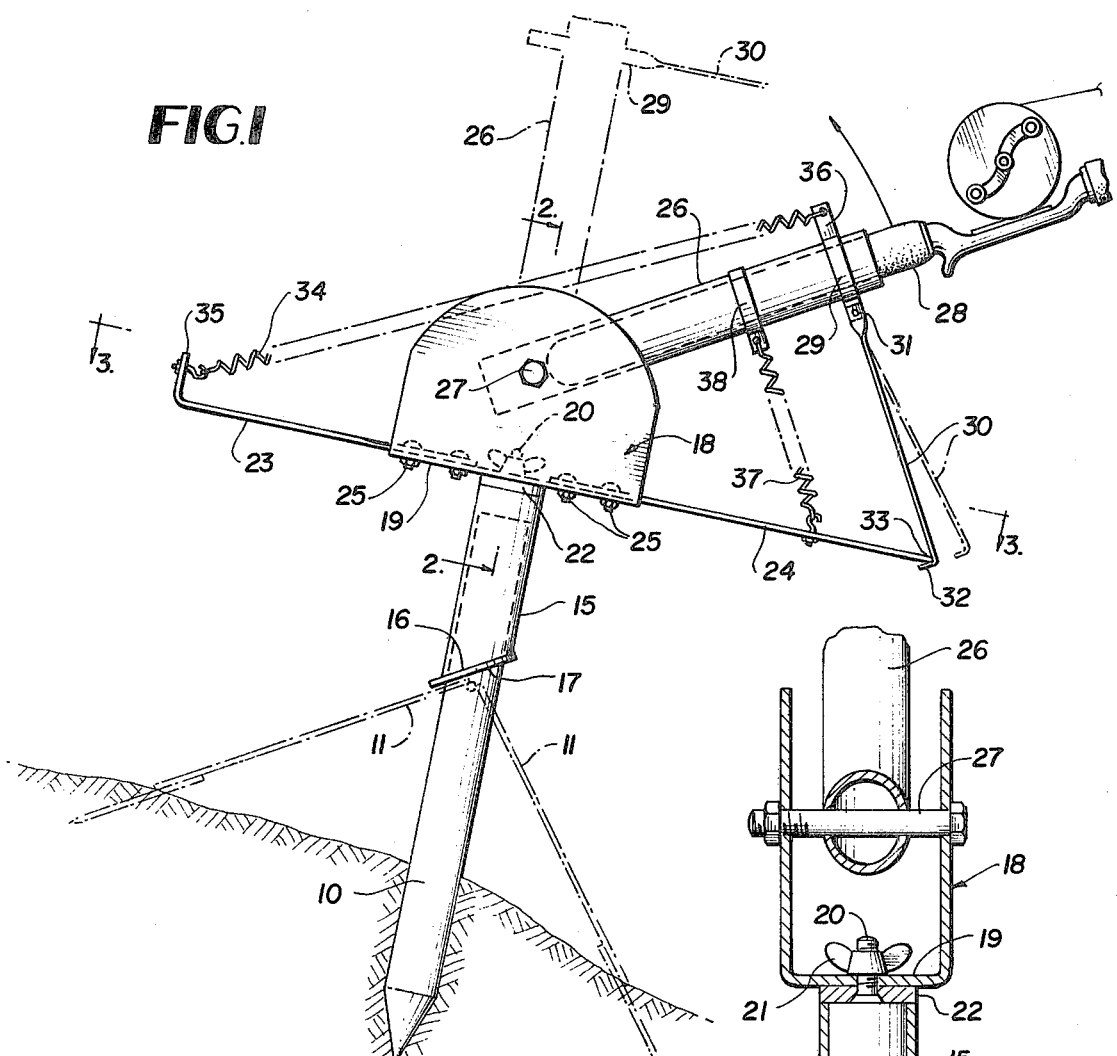
FIG.1
FIG.2
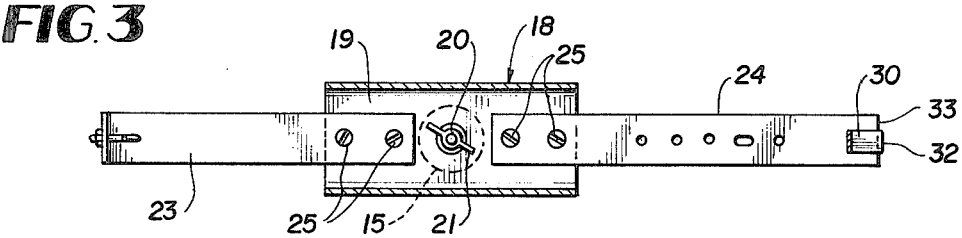
FIG.3
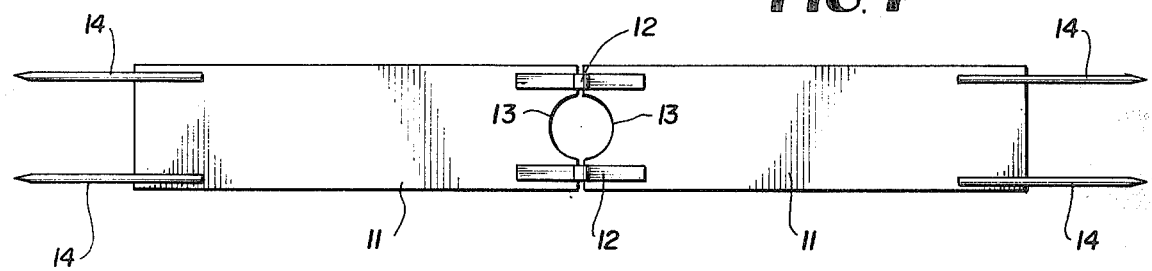
FIG.4

4,486,968

FISHING ROD SUPPORT AND TRIGGER

BACKGROUND OF THE INVENTION

Spring-operated automatic fishing devices are well known in a variety of forms. Such devices have not been widely adopted by fisherman mainly because of excessive cost and undue complexity. This invention, therefore, seeks to satisfy a definite need for a simpler, more practical and less expensive fishing device of the above-mentioned type which fishermen will be much more likely to adopt, in contrast to the prior art.

A further and more specific object of the invention is to provide a fishing device of the above character which can be conveniently packaged in a knocked-down state and assembled with ease by the user.

Other features and advantages of the invention will become apparent during the course of the following detailed description.

BRIEF DESCRIPTION OF THE DRAWINGS

FIG. 1 is a side elevation of a fishing device according to one preferred embodiment of the invention.

FIG. 2 is an enlarged fragmentary vertical section taken on line 2—2 of FIG. 1.

FIG. 3 is a section taken on line 3—3 of FIG. 1.

FIG. 4 is a plan view of an anchor stake stabilizer.

DETAILED DESCRIPTION

Figure 5:
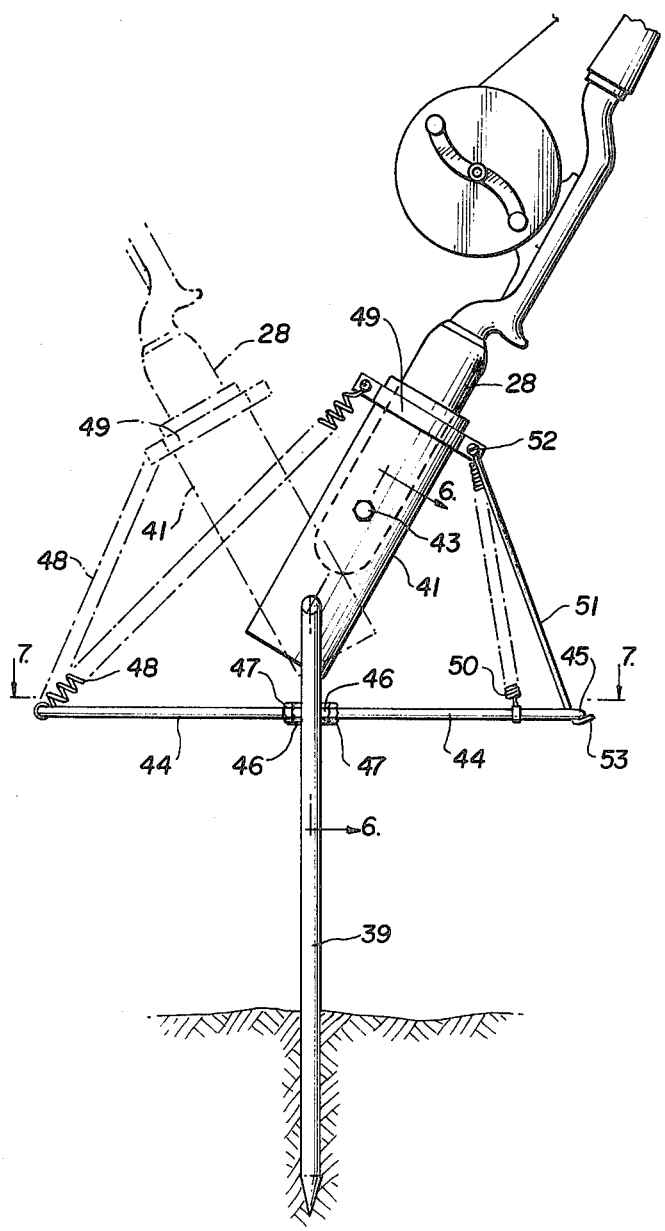
FIG. 5 is a side elevation of the device according to a second embodiment of the invention.

Referring to the drawings in detail wherein like numerals designate like parts, a first embodiment of the invention shown in FIGS. 1-4 comprises an anchor stake 10 of suitable length which may be driven into the soil to an adequate depth to support the fishing device.

Preferably, when the anchor stake 10 is embedded in soft soil or in sand, it is stabilized by a pair of stabilizer plates 11, FIG. 4, having their meeting ends connected by hinges 12 and having arcuate cut-outs 13 which engage opposite sides of the stake 10 at an elevation above ground level. At their outer ends, the plates 11 carry ground anchor rods 14 which penetrate the ground during use. In firmer soil, the stake stabilizer device may not be necessary and may be set aside.

The device further consists of a support sleeve 15 which telescopes over the top of stake 10 and has a beveled lower end 16 adapted to rest on an adjustable canted stop washer 17 mounted slidably on the stake 10 and having locking engagement therewith in a given selected adjusted position on the stake. The engaging end faces of the sleeve 15 and stop washer 17 also secure the sleeve 15 against rotation around the axis of the stake.

A U-cradle 18 is provided whose bottom wall 19 is centrally attached through a threaded stud 20 and winged nut 21 to the top of sleeve 15, the sleeve having a top end plate 22 welded thereto to which the stud 20 is anchored.

On opposite sides of the stud 20, arm sections 23 and 24 in the form of plates are secured by screws 25 to the bottom wall 19 of U-cradle 18. These arms lie in a common plane across and perpendicular to the axis of the sleeve 15 and stake 10.

A rod holder sleeve 26 has an opening formed therethrough near one end receiving a support and pivot bolt 27 held in openings in the side wall of the U-cradle 18 at an elevation above its bottom wall 19. The butt or handle 28 of a fishing rod can enter the support sleeve 26 with the rear end of the handle resting on the bolt 27, or a clamping set screw, not shown, can be provided on the sleeve 20 to engage and secure the handle 28.

Near its forward end, a clamp 29 is mounted on the support sleeve 26 and a latch arm 30 of somewhat springy material is attached at 31 to the bottom of the clamp 29. At its lower end, the latch arm 30 has a short right angular flange 32 which can engage the adjacent edge 33 of the arm 24 lockingly and releasably. The arm 30 is resiliently biased toward the release position shown in broken lines in FIG. 1 but will remain in the locking or engaged position when under sufficient tension.

Such tension is provided by a relatively strong tension spring 34 connected between an upturned end 35 of arm 23 and a top extension 36 of clamp 29. A counter-spring 37 of lesser tension substantially at right angles to the axis of spring 34 is connected between the arm 24 and another clamp 38 on the support sleeve 26. The second spring 37 exerts a stabilizing force on the structure but is easily overcome by the stronger spring 34 when a fish strikes the fish hook and applies tension on the fish line sufficient to release the latch arm 30 from the arm 24, at which point the spring 34 will instantly swing the sleeve 26 and fishing rod to the fish-catching position shown in broken lines in FIG. 1, where the sleeve 26 is coaxial with stake 10. The stretching of spring 37 prevents the sleeve 26 and rod from moving rearwardly beyond the fish-catching or snagging position in FIG. 1.

When resetting the device for another strike, it is only necessary to re-engage the latch arm 30 with the coacting arm 24 as shown in FIG. 1 after swinging the sleeve 26 and rod to the normal inclined fishing or waiting position.

Figure 6:
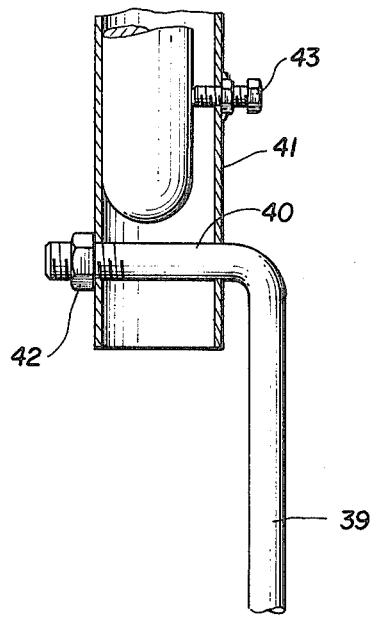
FIG. 6 is a fragmentary section taken on line 6—6 of FIG. 5.
Figure 7:
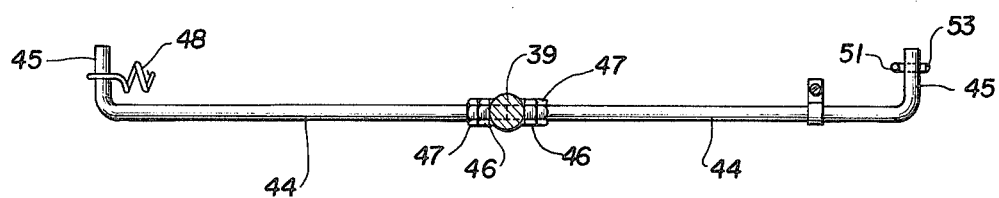
FIG. 7 is a horizontal section taken on line 7—7 of FIG. 5.

FIGS. 5 to 7 show a second embodiment of the device in which the ground anchor stake is formed by a pointed rod 39 having a short transverse extension 40 at its top end engaging through an opening or a rod support sleeve 41 near the lower end of the latter and being secured by a nut 42 engaged with threads of the extension 40. The previous sleeve 15, adjusting washer 17, and the cradle 18 are omitted in the second embodiment.

The fishing rod handle 28 is received in the sleeve 41 and locked by a side set screw 43. Arms 44 in the form of two rods having outer transverse ends 45 are detachably mounted on the stake 39 by threaded engagement with a pair of nuts 46 welded to opposite sides of the stake 39, the arms being further secured by lock nuts 47. An actuating spring 48, similar to the spring 34, is connected between the extension 45 of one arm 44 and a clamp 49 on the forward end of sleeve 41. A weaker counter-spring 50 corresponding to the spring 37 is connected between the other arm 44 and the clamp 49 at the opposite side of the clamp.

The stake 39 and arms 44 may be directly welded together or otherwise integrally joined in lieu of the detachable arrangement shown in the drawings.

A gravity-operated latch arm 51 has its upper end pivotally attached at 52 to the clamp 49 and a bottom short transverse extension 53 of the latch arm 51 can engage under the extension 45 of the adjacent arm 44 to form a latch for the sleeve 41 and rod in the normal fishing position shown in full lines in FIG. 5. When a fish strikes the hook, the tension on the fishing line will pivot the rod and sleeve 41 downwardly sufficiently to release the latch arm 51 from the extension 45 by gravity, and the sleeve 41 and rod will instantly be jerked to the fish catching position shown in broken lines by the action of spring 48.

Both forms of the invention are simple and effective, inexpensive to manufacture, easily packaged, and very simple to assemble.

It is to be understood that the forms of the invention herewith shown and described are to be taken as preferred examples of the same, and that various changes in the shape, size and arrangement of parts may be resorted to, without departing from the spirit of the invention or scope of the subjoined claims.

I claim:

1. A fishing device comprising an anchor stake adapted to be iserted in the soil in a generally upright position, a support arm structure fixed to the stake near its top substantially perpendicular thereto and projecting on opposite sides of the stake, a support and pivot means fixed to the stake and having a pivot axis above said support arm structure substantially at right angles thereto, a fishing rod handle support sleeve pivotally attached to the support and pivot means for rotation around said pivot axis of the means, a tension spring connected between one end of the arm structure and said sleeve and biasing the sleeve to a fish-catching position, a latch arm attached to said sleeve near the forward end of the sleeve and having releasable locking engagement with the other end of the arm structure, said support arm structure comprising a U-cradle at the top of said stake, a sleeve fixed dependingly to the bottom wall of the U-cradle and engaging the telescopically and removably over the top of the stake and having a beveled lower end, and a cooperating canted height adjustment washer movably mounted on the stake and being engageable with the beveled lower end to support the second-named sleeve on said stake at a selected height thereon.

2. A fishing device as defined in claim 1, and a pair of separate oppositely extending support arms detachably secured to the bottom wall of the U-cradle and forming said support arm structure.

3. A fishing device comprising an anchor stake adapted to be inserted in the soil in a generally upright position, a support arm structure fixed to the stake ner its top substantially perpendicular thereto and projecting on opposite sides of the stake, a support and pivot means fixed to the stake and having a pivot axis above said support arm structure substantially at right angles thereto, a fishing rod handle support sleeve pivotally attached to the support and pivot means for rotation around said pivot axis of the means, a tension spring connected between one end of the arm structure and said sleeve and biasing the sleeve to a fish-catching position, a latch arm attached to said sleeve near the forward end of the sleeve and having releasable locking engagement with the other end of the arm structure, said support arm structure comprising a U-cradle at the top of said stake, and a sleeve fixed dependingly to the bottom wall of the U-cradle and engaging telescopically and removably over the top of the stake.

* * * * *